United States Patent Office 3,367,109
Patented Feb. 6, 1968

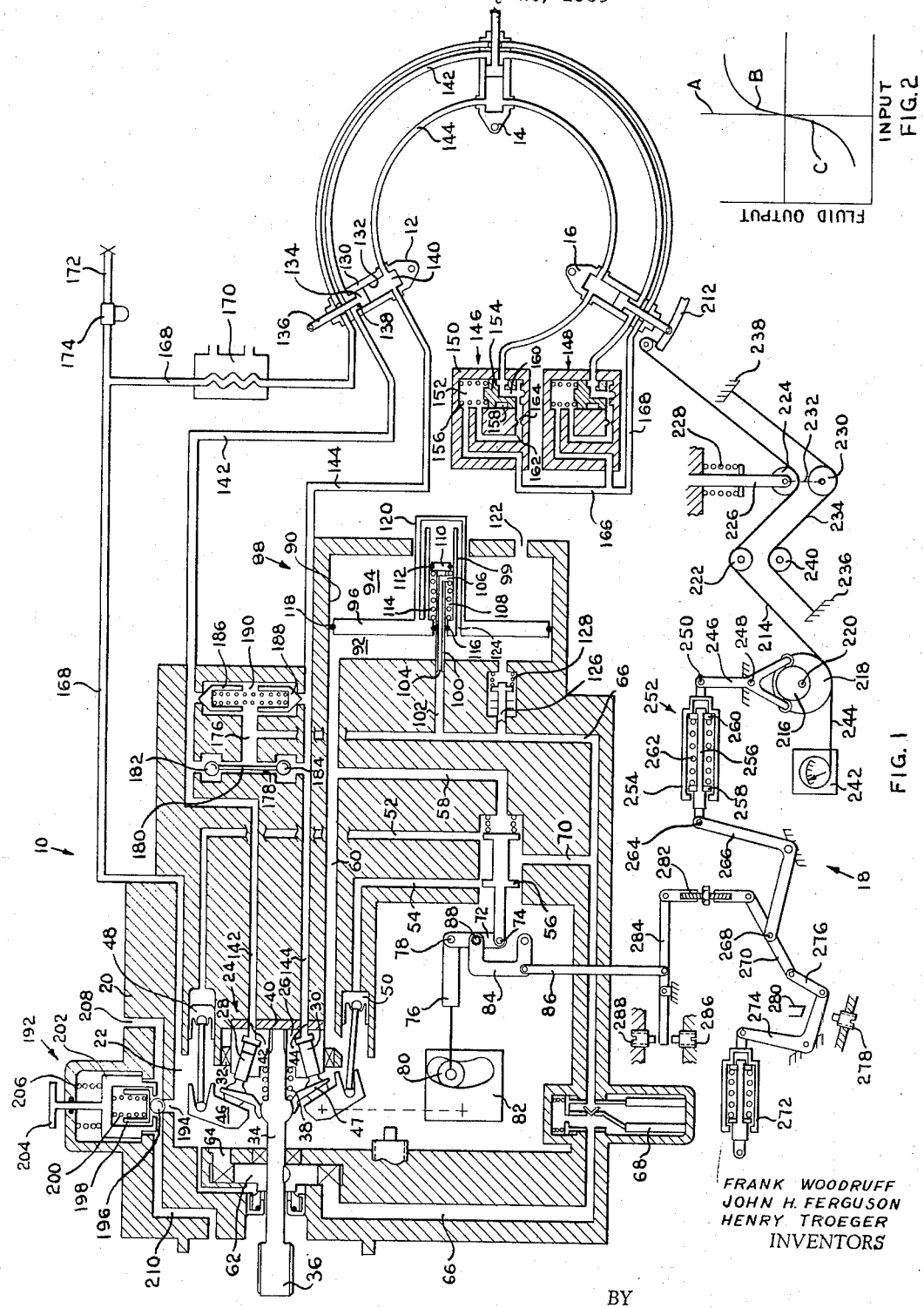

3,367,109
HYDRAULIC POWER-ACTUATOR SYSTEM
Henry Troeger, Cooperstown, John H. Ferguson, Sauquoit, and Frank Woodruff, New Hartford, N.Y., assignors to The Bendix Corporation, a corporation of Delaware
Filed July 29, 1966, Ser. No. 568,946
10 Claims. (Cl. 60—51)

The present invention relates to an hydraulic power actuator system particularly adapted for accurately positioning a remote actuator subject to high and variable loads and under severe environmental conditions such as, for example, are required for positioning nozzle gates of a gas turbine engine and the like.

The hydraulic positioning system represents an improvement in prior art systems, for example, of the type disclosed in predecessor U.S. Patent 2,945,449, issued July 19, 1960, to A. H. LeFebvre and J. R. Wiseman, and commonly assigned with the present application. In particular, the present invention offers the improvements of a self-contained control fluid source to free the system from the limitations and demands on other engine or aircraft hydraulic systems. As a result, it has greater versatility in application, and does not require added capacity, expense, or predesign consideration on auxiliary systems required by other devices.

A system containing a limited amount of self-contained fluid and particularly one subjected to high temperatures such as those found externally on the aft part of a gas turbine engine, poses many specialized and difficult design problems to guard against decomposition of control fluid, and resulting fouling of the many precision parts. The present invention offers a solution to these problems, and particularly advances the techniques of Patent 2,945,449.

It is an object of the invention to provide a hydraulic power-actuator system having a self-contained fluid supply and improved means providing continuous fluid circulation.

It is another object of the present invention to provide an hydraulic power-actuator system having means providing continuous fluid circulation while providing optimum dynamic performance of actuator response to applied control signal.

Further objects and advantages of the present invention will become apparent on consideration of the accompanying description and drawings wherein:

FIGURE 1 is a schematic drawing of a preferred form of a hydraulic power-actuator unit of the present invention; and FIGURE 2 is a graph showing an operating characteristic of our device.

Referring to FIGURE 1, there is shown a hydraulic system broadly comprising of a pumping unit generally designated by numeral 10, a plurality of remotely located actuators 12, 14 and 16 and input and actuator feedback summing linkage system 18. Three remote actuators are shown which are adapted to be arranged symmetrically about an engine to provide three points of connection to a ring of nozzle gates for uniform force application. The invention may, of course, be practiced with any reasonable number of remote actuators from as few as one to as many as the hydraulic capacity, cost and dynamics permit.

The hydraulic pumping unit includes a housing 20 which defines an interior control fluid containing chamber which contains a relatively low, but superatmospheric pressure control fluid. Regulation of this control fluid will be later described.

Within chamber 22 there is contained a variable stroke piston pump generally designated by numeral 24. Pump 24 includes a rotor 26, a plurality of annularly arranged axially inclined pistons, two of which are shown and designated by numerals 28 and 30. The pistons are received in complementary bores in the rotor which is mounted for rotation in bearing 32, and driven by drive shaft 34 which is received in a central rotor bore and keyed thereto.

Shaft 34 extends externally of housing 20 and contains a drive pinion or spline end 36 which is adapted to be driven by an external power source. Rotor 26 is spring loaded by spring 38 into a porting plate 40 having a first fluid transmitting port 42 and a second fluid transmitting port 44. A tiltable wobble plate 46 is non-rotatably mounted, but is tiltable in either direction from a plane normal to shaft 34. The rightward extending surface of the wobble plate is an annular bearing surface against which the piston ends are held in sliding contact. Ring 47, both rotatable with shaft 34 and tiltable, assists in holding the pistons against the wobble plate surface such that the deviation of the wobble plate from a plane normal to shaft 34 governs the degree of pumping stroke. Alignment with a normal plane with respect to shaft 34 may be termed the no-stroke or null position of the pump whereby the pistons are aimlessly rotating with rotor 26, but not reciprocating therein so that no pumping action occurs. If the wobble plate is tilted counterclockwise from the null position, the first fluid transmitting port 42 becomes the delivery port, and the second fluid transmitting port 44 the intake port. Clockwise movement of the wobble plate from null reverses this relationship establishing port 42 as the intake port and port 44 as the delivery port.

Wobble plate 46 is controlled in position or degree and direction of tilt from null by a pair of servo pistons 48 and 50 arranged at diametrically opposite points. The servo pistons are connected through passages 52 and 54 respectively to a spool type servo control valve 56. Spool valve communicates directly with low pressure control fluid in chamber 22 at its left side and indirectly with the same low pressure fluid on its right side through passages 58 and 60. An intermediate pressure control fluid for servo operation is supplied by a roller vane type boost pump 62 mounted on and driven by shaft 34. Boost pump 62 draws fluid from low pressure chamber 22 through boost intake passage 64 and delivers an intermediate or boost pressure fluid through boost delivery passage 66, which contains pressure relieving type filter 68 to branch passage 70 which supplies servo fluid to spool valve 56 intermediate its lands. Boost pressure is termed intermediate pressure fluid, as it is intermediate to low pressure in chamber 22 and high delivery pressure supplied by variable stroke pump 24. Spool valve 56 is illustrated in its stable position whereby substantially equal fluid pressure is supplied to both passages 52 and 54, and the wobble plate is held in a given position. Movement of spool valve 56 to the left applies greater pressure to piston 50 than piston 48 tilting the wobble plate clockwise. Rightward movement of the spool valve reverses the operation applying greater pressure to piston 48, inducing counterclockwise movements of the wobble plate.

The controlling signal for spool valve is received from a first summing link 72 which is pivotally connected to the spool valve by pivot 74. A feedback signal is supplied from the wobble plate by link 76 which is pinned at 78 to the opposite end of the link 72. Feedback link 76 has a roller 80 at its end which rides in a slot cam 82 formed in the wobble plate. For clarity, the cam 82 is illustrated offset from the wobble plate to reveal the cam slot. A dotted line between the wobble plate and cam signifies that the cam is actually a part of the wobble plate. Cam 82 is contoured to have relatively high gain at the wobble plate null position and lower gain at deviations from null. This functional characteristic is illustrated in the graph of FIGURE 2 and improves system response as will later be more fully described. The servo valve input signal is supplied by links 84 and 86 which are pinned to each other, and link 84 is pinned to an intermediate point 88 of the first summing link 72. Movement of servo valve input link 86 moves summing link 72, displacing servo valve 56 and positioning the wobble plate. As this wobble plate moves, roller 80 follows cam 82 supplying a restoring movement through the feedback link to summing link 72 which returns the servo valve to its stable position.

Fluid pressure in chamber 22 is maintained at a regulated low super-atmospheric value by an accumulator generally designated by numeral 88 which additionally supplies make-up fluid to replenish any loss from the system or required by the actuators, and to adjust for fluid volume changes induced by temperature change.

An accumulator chamber 90 is formed in housing 20, and is divided into first and second accumulator chambers 92 and 94, respectively, by accumulator piston 96 which is slidable in chamber 90. Accumulator piston has a first sleeve extension 99 extending to the right. A rod member 100 is secured on one end to housing 20 where it communicates with passage 102 which receivest boost pump delivery fluid. Rod 100 extends within sleeve 99, and has an internal passage 104 which terminates with transverse drilled passage 106 so that boost pump delivery pressure is supplied to chamber 108 formed within the sleeve 99. An abutment 110 having a ring seal 112 is secured to rod 100 to complete chamber 108, and provide a retainer for spring 114. Piston 96 has an inner diameter seal 116 and an outer diameter seal 118 to provide slideable seal contact with rod 100 and chamber 90 respectively. A second sleeve extension 120 is concentric and disposed radially outwardly of first sleeve extension 99. Sleeve extension 120 extends externally through housing 20 whereby the degree of extension reflects the amount of fluid in the system, and the need to supplement the fluid charge. Chamber 94 is vented to the atmosphere by vent passage 122 and/or clearance between sleeve 120 and the housing. Sleeve 120 has a closed end so that fluid leaking past seal 112 is trapped and returned through pasage 124 to low pressure chamber 92. One beneficial feature of the accumulator is that of the three seals provided, i.e., 112, 116 and 118, only seal 118 will permit leakage out of the system, and it is exposed to the very lowest fluid pressure in chamber 92.

A differential pressure regulating valve 126 is disposed between boost pump pressure in line 66 and low pressure fluid in chamber 92, and is responsive in position to the applied fluid pressure loading. Spring 128 applies a pre-load urging the valve in a closed direction.

Pressure differential valve 126 and accumulator 88 cooperate to provide a regulated pressure in chamber 92 which is connected through passage 60 to low pressure fluid chamber 22. Assuming for the moment constant atmospheric pressure and constant loading of spring 114, accumulator piston 96 is balanced by a predetermined pressure ratio between boost pump pressure in chamber 108 and low pressure in chamber 92. This ratio is dependent on the area ratios the fluids act on. Thus, if it were assumed a 19:1 area ratio on accumulator piston and the regulator valve spring 128 were selected to provide a differential pressure of 180 p.s.i. a boost pump delivery pressure of 190 p.s.i. and low pressure of 10 p.s.i. would be the only pressures that would satisfy both accumulator and regulator valve. Thus, regulation of the low pressure is obtained without comparison to external reference. The accumulator is sometimes referred to as a bootstrap accumulator, since it operates to regulate system pressures by sensing the self-same system pressures and, in a sense, lifts itself by its own bootstraps. Atmospheric pressure in chamber 94 will, of course, vary with altitude such that the pressures previously discussed are gage rather than absolute pressure. Venting to atmosphere simplifies the accumulator structure, but is in no manner a limitation of the system invention (as contrasted novelty in the accumulator per se) which could as well be referenced to absolute pressure if one deemed the expense of an evacuated chamber justified. Spring 108 provides a bias against piston 96 at shut down so that low pressure fluid is never without some slight degree of pressurization.

Turning now to the remote actuators 12, 14 and 16, all are functionally identical and thus description will proceed with reference to only one. Actuator 12 includes a housing 130 having a main chamber 132 in which is slidably disposed a differential area piston 134 having an actuator rod 136 extending externally from the housing. Piston 134 divides main chamber 132 into a rod end chamber 138 on one piston side and a head end chamber 140 on the other. A first fluid transmitting passage 142 is connected on one end to first port 42 of piston pump 24 and connects in series with each rod end chamber of the actuators 12, 14 and 16. Second fluid transmitting passage 144 is connected on one end to second port 44 of pump 24 and connects in series all head end chambers of the actuators, however, the series connections are not a limitation of the invention, since parallel connections may be used.

Located in the region of the actuators, and preferably downstream thereof, are two bleed or leakage control valves 146 and 148 connected to passages 142 and 144 respectively. The bleed valves are of identical construction and referring to valve 146 are comprised of a housing 150 defining a valve chamber 152 in which is disposed a movable valve element 154 biased to a shut-off position by spring 156. Valve element has an annular groove 158 which cooperates with the end of passage 144 to provide a variable restrictive or pressure reducing orifice. The reduced regulated pressure is transmitted from groove 158 through passage 160 to the lower end of the valve where it applies an upward force which opposes spring 156 and closes the variable restriction between groove 158 and passage 144. Fluid passes from the lower valve end through passage 162 which contains a fixed bleed flow restrictor 164 to a chamber on the upper side of valve element 154 where it assists spring 156, and insures removal of any stagnant fluid therefrom. An outlet passage 166 is connected to return passage 168 which returns fluid to the low pressure chamber 22 in the pump housing. Passage 168 is connected to a groove in each actuator at the rod end to collect any leakage of high pressure fluid past the rods.

The valve 146 operates to regulate a controlled amount of fluid leakage, regardless of pressure in line 144. This is accomplished by applying a regulated pressure drop across restrictor 164. The downstream pressure is the low pressure fluid of chamber 22, which as before described, is regulated by accumulator 88. Upstream pressure is regulated by the valve element 154 which is a pressure regulating valve and senses the restrictor upstream pressure over its lower end. For example, should the pressure in line 144 increase, it will momentarily change the upstream pressure causing a greater upward force on the valve element which closes the variable restricting restoring the regulated pressure to substantially its former value.

Controlled leakage through valves 146 and 148 insures that after start up, fluid of a predetermined controlled amount will be circulating through the system. This prevents fluid from remaining static near engine hot areas and decomposing, thereby fouling the system. It is desirable that the valves have a normally closed characteristic, since this prevents excessive fluid drain during start up which would retard the time the system came into regulation and operation.

A heat exchanger 170 is provided in return line 168. This may be connected to any available cool fluid, as for example an engine fuel line may be connected to the heat exchanger. The cooler engine fuel will extract heat from this hydraulic system.

Inlet conduit 172 with a filter 174 may be used to fill the system or recharge it if accumulator sleeve 120 indicates the charge is low.

Leakage or bleed flow into the system is also provided by the boost pump. Conduit 66 is further connected to passage 176 leading to chamber 178 in which is disposed a shuttle valve 180. The shuttle valve has valve closure elements 182 and 184, one at each end, which sense respective pressures in the first and second fluid conduits 142 and 144. When pressure in passage 144 is greater than that in passage 142, valve element 184 closes and element 182 opens. Leakage flow is then supplied by the boost pump to line 142 and through pump 24 to line 144. At pump null condition, the shuttle valve may be balanced in which case leakage flow may divide at the shuttle valve, one-half through each of the elements 182 and 184. The shuttle valve also permits make-up fluid to enter line 142 and flow into pump inlet port 42 when actuators are moved towards the rod end, and takes fluid from line 144 which flows to case 22 through valve 126 when actuators move to the head end to compensate for the fluid volume displaced by actuator rods.

Two overload pressure relief valves are provided, rod side relief valve 186 and head side relief valve 188, which communicate with lines 142 and 144 respectively. A common spring 190 holds the valves in a normally closed position for most normal operation. Should, however, the actuators bottom out or engine nozzle gates jam up, the pump 24 will continue to supply fluid which will be recirculated through one of the relief valves. For example, if pump 24 were trying to position the actuators toward the head end but because of an unexpected freezing or jam-up of the gates the actuators could not move, the pressure in line 142 would build up until the load of spring 190 is overcome. Fluid would then pass through relief valve 186 into conduit 176, through the shuttle valve element 180 and into line 144 where the pump would pick up for recirculation.

A case relief valve 192 is mounted in housing 20 and is connected to chamber 22 through a passage 194. The case relief valve consists of ball valve element 196, spring retainer piston 198 and loading spring 200 mounted within manual release housing 202 which extends outside the housing, thus providing a handle 204. Manual release housing is biased downwardly into seating position by spring 206. In the event the case is overfilled, which could occur by filling to capacity at a low temperature and then exposing the unit to a higher temperature environment which increases fluid volume, case pressure would increase above its regulated value overcoming case relief valve 196. Excess fluid would then be dumped overboard through passage 208. Passage 208 is also connected to pad drain passage 210 to remove any excess fluid collecting in this area. It may also be desirable to manually vent the case to bleed off entrapped air which may be accomplished by manually pulling back on handle 204 and holding the valve open against the bias of spring 206. Spring 206 prevents case relief valve from being inadvertently left open.

Reference is next made to the feedback linkage summing system 18. A fragmentary portion of nozzle gate positioning ring 212 is shown attached to actuator 16 and responsive to actual nozzle gate position. Feedback cable 214 is secured to ring 212 and transmits an actual gate position signal to feed back eccentric cam 216 which is mounted on pulley 218 rotatable about shaft 220. A torque spring or similar device, not shown, would normally be used to apply a torque to pulley 218 to insure that cable 214 is always in tension. Intermediate pulley 222 rotates about a shaft of fixed location, whereas compensating pulley 224 is movable with rod 226 biased by spring 228. A reference pulley 230 is mounted on the same shaft as pulley 224, represented by dotted line 232, but for clarity is illustrated offset therefrom. A temperature reference cable 234 is fixedly anchored at each end, 236 and 238 respectively, at remote points of the engine and also rides in pulley 240 which preferably would be arranged on or near the same axis as pulley 222. As the pumping unit 10 and actuators 12, 14 and 16 are mounted at spaced points on an engine, the distance between them may alter due to temperature expansion and contraction of the engine. Any such changes would normally affect the position signal transmitted to cam 216 by cable 214. This effect is compensated by reference cable 234 which, in event of growth of the engine, will reset the pair of pulleys 224 and 230, thus compensating cable 214 an amount sufficient to offset the changes.

An indicator of actual gate position 242 is connected by cable 244 to feedback pulley 218 to provide a read-out indicator which may, for example, be located in a pilot's compartment.

A bifurcated cam follower 246 pivoted at 248 follows eccentric cam 216 providing two way positive positioning. Cam follower 246 is pinned at 250 to overtravel link 252. The overtravel link has an exterior housing 254 concentric with rod 256 which contains spaced abutment members 258 and 260 which retain a coil spring member 262. The overtravel link normally provides a solid link connection which, however, will collapse when excessive force is supplied either compressing or elongating the link. Should a compressive load exceed the preload of spring 262, abutment 258 and rod 256 will move relative to housing 254 permitting a collapsing override. Should tension load exceed spring 262 bias, abutment 260 with rod 256 will move relative to housing 254 permitting an extended override. Overtravel link 252 is pinned at 264 to bell crank 266 which in turn is pinned at 268 to second summing link 270. An input or demand signal is supplied to summing link 270 from input linkage means comprised of overtravel link 272, bell crank 274 and link 276. Maximum and minimum travel stops 278 and 280, respectively, limit movement of input signal bell crank 274. Second summing link 270 compares input and feedback signals, and supplies a differential or error signal to adjustable link 282 which is adjustable to permit fine null system setting or calibration. The error signal is transmitted through link 284 to the pump system input link 86, previously described. Error signal limit stops 286 and 288 are provided to limit maximum rotation of lever 284.

Because of the use of differential area piston actuators, external load friction and high loading by expelling engine gases on nozzle gates, the steady state nozzle gate position will not normally coincide with null position of pump 24. The term "steady state" thus is used to refer to the stable (no movement) condition of actuators 12, 14 and 16, whereas the term "null" will be used only in reference to pump 24 to indicate wobble plate 46 is in plane normal to shaft 34 and pistons 28 are not stroking in their bores. Servo valve 56 and the summing links would be in a balanced condition.

If now the operator called for a new gate position from the steady state by moving bell crank 274, this movement is transmitted through the linkages to servo valve 56, unbalancing pressure in lines 52 and 54 and at the wobble plate pistons 48 and 50. As the wobble plate moves to a new position, its movement is transmitted through feedback cam 82 and link 76 to first summing link 72, restoring servo valve 56 to its balanced position. Movement of the wobble plate has also changed piston 28 stroke and altered the pressure difference between lines 142 and 144. The pressure difference on opposed rod end head end side of actuator pistons is thus uniformly changed and repositions nozzle gates. The movement of the output device or nozzle gates is fed back through ring 212, Cable 214 to rotate eccentric cam 216 and follower 246. This movement is transmitted through over travel link 252 and bell crank 266 to restore second summing link 270.

The system movement above described results from a demand change by the operator. Should, however, the loading on nozzle gates occur independent of operator control, the load unbalance will begin to move the nozzle gates and through the feedback system unbalance second summing link 270. This causes an error signal to the servo valve 56 which initiates restoring system movement independent of the operator. Thus, the system will automatically maintain the selected output condition even when external disturbances are felt.

An important objective of the invention is to provide a recirculating or leakage flow in a self-contained fluid system. As the pumping unit employs a wobble plate pump which first delivers fluid in one direction and then another, it requires passing through a null or flow reversal condition. During the transition through null, the flow delivery passes to zero. Of course, in and around this region, the flow required for leakage may require all or a substantial part of pump delivery. To avoid any adverse effects on system dynamics or minimize such effects to a negligible point, a high gain characteristic is formed on pump feedback cam 82. Referring to FIGURE 2, ordinate A represents pump null and points B and C flow delivery points on either side of null. The steep or high gain slope of the curve between points B and C, representative of the cam contour, causes a quick transition through null for a small change in input position signal. Reduced gain is provided outside this transition zone compatible with normal system dynamics. Thus, the inherent cross-over lag in a system providing leakage flow is substantially eliminated. It will also be observed that the use of slow regulating leakage valves 146 and 148 provides for a known regulated quantity of leakage flow. Since this quantity is not a variable, the transition lag can be compensated to a known degree by the high gain contour of cam 82.

It is to be understood that persons skilled in the art can make changes in the disclosed system showing a preferred form of our invention without departing from the scope and spirit of the invention as set forth in the appended claims.

We claim:
1. An hydraulic power-actuator system comprising:
   a housing defining a chamber containing control fluid therein;
   a variable stroke piston pump means in said housing having first and second fluid transmitting ports;
   said pump means having a movable wobble plate tiltable in either of two opposing directions from a neutral no stroke null position, said pump means operative to draw fluid from one of said first and second fluid transmitting ports, and deliver fluid to the other of said first and second fluid transmitting ports depending on the direction said wobble plate is tilted from its null position;
   remotely located piston actuator means having a movable actuator piston and first and second fluid chambers on opposed piston sides;
   first and second fluid conduits interconnecting said first and second fluid transmitting ports with said first and second fluid chambers respectively;
   first and second flow limiting means connected to said first and second fluid chambers respectively to provide a controlled amount of bleed fluid flow from each of said first and second fluid chambers;
   return conduit means connected to each of said first and second flow limiting means and the chamber containing control fluid in said housing to return bleed flow to said housing;
   accumulator means contained in said housing operative to regulate pressure of control fluid in said housing to a low superatmospheric pressure;
   servo valve and piston means connected to said wobble plate for controlling the position thereof in response to an input signal; and,
   boost pump means connected to said control fluid chamber in said housing operative to supply pressurized servo control fluid to said servo valve and piston means.

2. An hydraulic power-actuator system as claimed in claim 1 wherein:
   said boost pump means additionally supplies a regulating fluid pressure to said accumulator; and
   a differential pressure regulator valve interconnected between said low superatmospheric pressure and delivery of said boost pump means to establish a predetermined pressure difference therebetween.

3. An hydraulic power-actuator system as claimed in claim 1 including:
   shuttle valve means interconnecting said boost pump means and said first and second fluid conduits;
   said shuttle valve means responsive to the fluid pressure difference existing between fluid in said first and second fluid conduits to shuttle between operative positions whereby bleed flow is supplied to the lower pressure containing first and second fluid conduit to supply make up leakage flow thereto.

4. An hydraulic power-actuator system as claimed in claim 1 wherein:
   said first and second flow limiting means each contain a fixed restrictive flow bleed and a pressure regulating valve operative to regulate pressure upstream of said flow bleed to a predetermined valve thereby regulating bleed flow.

5. An hydraulic power-actuator system as claimed in claim 4 wherein:
   said pressure regulating valves normally biased in a closed direction to shut-off bleed flow before regulation pressure is reached to prevent a leakage flow system drain during start up.

6. An hydraulic power-actuator system as claimed in claim 1 including a contoured cam feedback connection between said wobble plate and said servo valve and piston means; said cam contoured to establish a high gain servo valve-to-wobble plate relationship at wobble plate null position and a lower gain relationship at position substantially off the null position.

7. An hydraulic power-actuator system as claimed in claim 1 wherein:
   said accumulator means is comprised of a movable accumulator piston slidably mounted in said housing within a chamber formed therein divided into first and second accumulator chambers on opposed sides of said accumulator piston, said first accumulator chamber fluidly connected to said chamber defined in said housing containing control fluid therein to supply make-up fluid and regulate the valve of control fluid therein to a low pressure superatmospheric value;
   said accumulator piston including a sleeve extension extending into said second accumulator chamber; and,
   spring means contained within said sleeve extention to bias said accumulator against the fluid in said first accumulator chamber.

8. An hydraulic power-actuator system as claimed in claim 7 including rod and abutment means secured on one end to said housing and extending on the other end into said sleeve extension to provide a retainer for said spring means and define an accumulator reference pressure chamber within said sleeve extension; and said rod abutment means including reference pressure passage means formed therein connected to said boost pump to supply a regulating fluid reference pressure acting on said accumulator piston.

9. An hydraulic power-actuator system as claimed in claim 8 including a protective sleeve concentric and radially outward of said sleeve extension and secured to said accumulator piston, said protective sleeve connected internally through said accumulator piston to said first accumulator chamber and extending externally through a side wall of said housing.

10. An hydraulic power-actuator system as claimed in claim 9 wherein:

said second accumulator chamber is vented to atmospheric pressure.

No references cited.

EDGAR W. GEOGHEGAN, *Primary Examiner*.